(12) United States Patent
Kimura

(10) Patent No.: US 6,603,235 B1
(45) Date of Patent: Aug. 5, 2003

(54) SMALL-SIZED MOTOR HAVING A BRUSH UNIT WITH AN IMPROVED BRUSH ARM AND TERMINAL CONNECTIONS

(75) Inventor: Hiroshi Kimura, Chiba (JP)

(73) Assignee: Mabuchi Motor Co. (JP)

( * ) Notice: Subject to any disclaimer, the term of this patent is extended or adjusted under 35 U.S.C. 154(b) by 0 days.

(21) Appl. No.: 09/868,019

(22) PCT Filed: Oct. 24, 2000

(86) PCT No.: PCT/JP00/07440

§ 371 (c)(1),
(2), (4) Date: Jun. 12, 2001

(87) PCT Pub. No.: WO01/33699

PCT Pub. Date: May 10, 2001

(30) Foreign Application Priority Data

Nov. 2, 1999  (JP) .......................... 11-311768

(51) Int. Cl.⁷ .......................... H02K 13/10; H02K 5/14
(52) U.S. Cl. ..................................... 310/239
(58) Field of Search ............... 310/244, 246, 310/239, 245, 40 MM, 71; 30/240

(56) References Cited

U.S. PATENT DOCUMENTS

| | | | | |
|---|---|---|---|---|
| 1,502,139 A | * | 7/1924 | Elliott et al. | 310/244 |
| 3,175,113 A | * | 3/1965 | Simmons et al. | 310/246 |
| 4,088,912 A | * | 5/1978 | Yoshida | 310/244 |
| 4,238,703 A | * | 12/1980 | Yoshida | 310/242 |
| 4,431,933 A | * | 2/1984 | Mabuchi | 310/239 |
| 4,494,029 A | * | 1/1985 | Hoshino et al. | 310/239 |
| 4,574,215 A | * | 3/1986 | Mabuchi | 310/239 |
| 4,746,829 A | * | 5/1988 | Strobl | 310/239 |
| 5,034,640 A | * | 7/1991 | Shimizu | 310/71 |
| 5,287,028 A | * | 2/1994 | Suzuki et al. | 310/71 |
| 5,563,462 A | * | 10/1996 | Strobl et al. | 310/71 |
| 5,633,542 A | * | 5/1997 | Yuhi et al. | 310/40 MM |
| 5,780,952 A | * | 7/1998 | Lau | 310/239 |
| 6,339,272 B1 | * | 1/2002 | Sato | 310/87 |
| 6,465,920 B2 | * | 10/2002 | Harita et al. | 310/71 |

FOREIGN PATENT DOCUMENTS

| | | | | |
|---|---|---|---|---|
| GB | 2151413 | * | 11/1984 | H02K/5/24 |
| GB | 2207295 | * | 7/1987 | H02K/13/00 |
| GB | 2214358 | * | 11/1988 | H01R/39/39 |
| JP | 50111334 | * | 9/1975 | H02K/5/14 |
| JP | 61135585 | * | 6/1986 | H02K/13/00 |
| JP | 7-30572 | | 6/1996 | |
| JP | 08258991 | * | 9/1996 | H02K/5/14 |
| JP | 10366943 | * | 2/1998 | H02K/5/14 |
| JP | 09-148368 | * | 12/1998 | H02K/13/00 |
| JP | 10-341557 | | 12/1998 | |
| JP | 10366944 | * | 12/1998 | H02K/13/00 |
| JP | 11004967 | * | 1/1999 | H02K/13/00 |
| JP | 11311768 | * | 11/1999 | H02K/13/00 |
| JP | WO 01/33699 | * | 10/2000 | H02K/5/14 |
| JP | WO 01/39354 | * | 10/2000 | H02K/13/00 |

* cited by examiner

Primary Examiner—Nestor Ramirez
Assistant Examiner—Heba Y. Elkassabgi
(74) Attorney, Agent, or Firm—McGlew and Tuttle, P.C.

(57) ABSTRACT

A brush unit includes a carbon brush 1, a substantially straight brush arm 2 for holding the carbon brush 1, and a brush base 3 connected to the brush arm 2. The brush base 3 is provided with a receptacle terminal 5 formed by cutting and raising the brush base 3, and thereby the brush base 3 is formed with a base hole 6 corresponding to the receptacle terminal 5. The brush unit is installed to a case cover 4 at two locations of a fixing portion in which the brush arm 2 is fixed to the brush base 3, and a brush base end portion integral with a base portion of the receptacle terminal 5, so that noise is reduced by decreasing a vibration component in an axial direction of the motor at a sliding portion at which the carbon brush 1 slides with-respect to a commutator at the time of motor rotation, and also brush tension is not changed when outside terminals are inserted through outside terminal insertion holes.

8 Claims, 4 Drawing Sheets

Brush Unit

Motor

Brush Unit (A)    (B)

Brush Unit

SMALL-SIZED MOTOR HAVING A BRUSH UNIT WITH AN IMPROVED BRUSH ARM AND TERMINAL CONNECTIONS

TECHNICAL FIELD

The present invention relates to a small-size motor and, more particularly, to a small-size motor in which the characteristics of a brush unit are improved.

BACKGROUND OF THE INVENTION

FIG. 7 shows a brush unit for a conventional small-size motor. Usually, the small-size motor is configured by containing a rotor composed by assembling various parts on a shaft, together with magnets serving as magnetic poles on a stator, in a motor case and by mounting a case cover on an opening of the motor case. Also, the case cover is usually provided with brushes and their electrical and mechanical connecting arrangement. FIG. 7 is a view of the case cover, which is viewed from a motor inside.

Each brush unit is made up of a carbon brush 1, a brush arm 2, and a brush base 3. In this conventional brush unit, the brush arm 2 is bent into an L shape, and is fixed to the brush base 3 in a fixing portion 7. Each attachment groove is formed between protruding portions formed integrally with the case cover made of a synthetic resin so as to hold and support only one location of the fixing portion in which the brush arm 2 is fixed to the brush base 3. End portions of the brush bases 3, which function as receptacle terminals 5, come into contact with a pair of outside terminals 24 inserted from the outside through outside terminal insertion holes 10.

However, it has been revealed from a result of structural analysis that in the conventional bush device, since the brush arm 2 is bent into an L shape, noise is generated by an occurrence of a vibration component in an axial direction of the motor at a brush sliding portion at which the carbon brush 1 slides with respect to a commutator at the time of motor rotation.

Further, the outside terminal 24 is inserted through the outside terminal insertion hole 10 and presses on the receptacle terminal 5 (brush base 3), so that this influence reaches the brush sliding portion, whereby the brush tension may be undesirably changed.

Also, the end portion (contact portion contacting with the outside terminal 24) of the receptacle terminal 5 must be set at a position near the outside terminal insertion hole 10 in order that the receptacle terminal 5 may be used for a short outside terminal 24, which presents a problem in that the receptacle terminal 5 cannot be lengthened. A short receptacle terminal 5 cannot ensure sufficiently high spring properties.

DISCLOSURE OF THE INVENTION

The present invention has been achieved to solve the above problems, and accordingly an object thereof is to provide a small-size motor having brush units in which a brush arm need not be bent into an L shape and noise can be reduced by decreasing a vibration component in the axial direction of the motor at a sliding portion at which a carbon brush slides with respect to a commutator at the time of motor rotation.

Also, another object of the present invention is to provide a small-size motor having brush units in which brush tension is not changed when outside terminals are inserted through outside terminal insertion holes.

Further, still another object of the present invention is to provide a small-size motor having brush units capable of being used for short outside terminals.

The small-size motor in accordance with the present invention includes: a metallic case 21 of a bottomed hollow cylindrical shape, fitted with magnets 22 on the inner peripheral surface thereof; a case cover 4 made of a synthetic resin, mounted so as to close an opening of the case 21 and fitted with brush units; a rotor fitted with a laminated core 16; windings 17 wound on the laminated core 16; and a commutator 14 on a shaft 15. The brush unit includes: a carbon brush 1 being into slidable contact with the commutator 14; a substantially straight brush arm 2 for holding the carbon brush 1; and a brush base 3 connected to the brush arm 2. The brush base 3 is provided with a receptacle terminal 5 formed by cutting and raising the brush base 3, and thereby the brush base 3 is formed with a base hole 6 corresponding to the receptacle terminal 5. The case cover 4 is formed with outside terminal insertion holes 10 for inserting terminals for electrical connection from the outside to bring the terminals into contact with the receptacle terminals 5. The brush unit is installed to the case cover 4 at two locations of a fixing portion 8 in which the brush arm 2 is fixed to the brush base 3, and a brush base end portion 9 integral with a base portion 5' of the receptacle terminal 5.

Also, the present invention provides a small-size motor in which a brush base 3 is formed with a base hole 6 in the center thereof, a male terminal 11 for electrical connection from the outside is provided at one end of the brush base 3, and a case cover 4 is formed with openings (male terminal projecting holes 12) for projecting the male terminals 11. In this small-size motor, likewise, a brush unit is installed to the case cover 4 at two locations of a fixing portion in which a brush arm 2 is fixed to the brush base 3, and a brush base end portion.

DETAILED DESCRIPTION OF THE INVENTION

Figure 1:
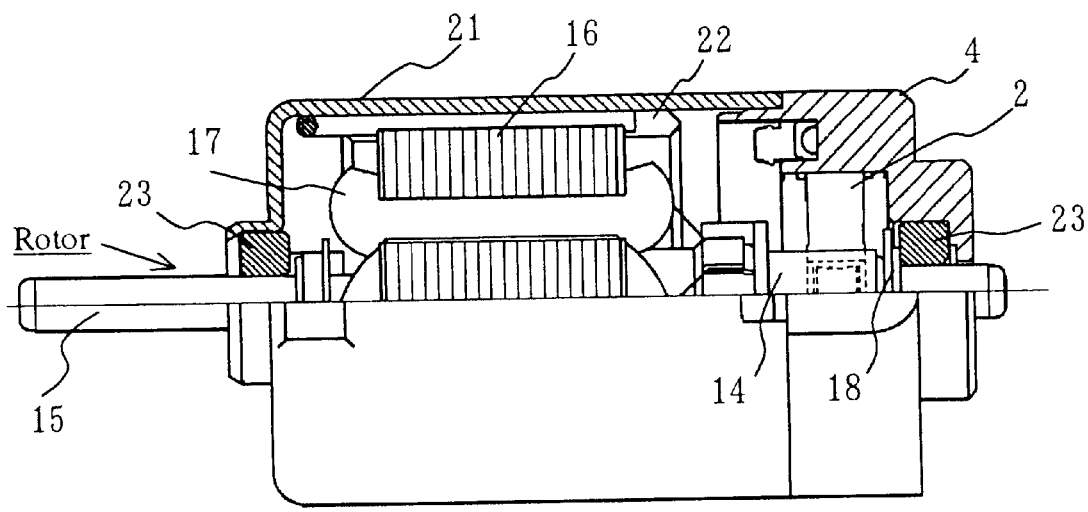
FIG. 1 is a side view showing the whole of a small-size motor in accordance with the present invention, in which an upper half portion of the motor is shown in cross section.

FIG. 1 is a side view showing the whole of a small-size motor in accordance with the present invention, in which an upper half portion of the motor is shown in cross section. The small-size motor in accordance with the present invention is the same as the small-size motor of the prior art except for the arrangement of brush units and a case cover for attaching the brush units. As shown in FIG. 1, magnets 22 are installed on the inner peripheral surface of a motor case 21 formed of a metallic material into a bottomed hollow cylindrical shape. An opening of the motor case 21 is mounted with a case cover 4 made of a synthetic resin. In a central portion of the case cover 4, a bearing 23 for supporting a shaft 15 is contained.

The other end of the shaft 15 is supported by a bearing 23 provided in the center of the bottom of the motor case 21 of a bottomed hollow cylindrical shape. The shaft 15 is usually provided with a laminated core 16, windings 17 wound on the laminated core 16, and a commutator 14, which constitute a rotor of the small-size motor. A pair of carbon brushes being in contact with the commutator 14 are supported via the brush arms 2 on the case cover 4 made of synthetic resin, and are electrically connected to the outside by receptacle terminals connected to brush arms 2 via brush bases, as will be described later in detail. An oil retaining washer 18 prevents oil impregnated into the bearing 23 from flowing onto the commutator.

Figure 2:
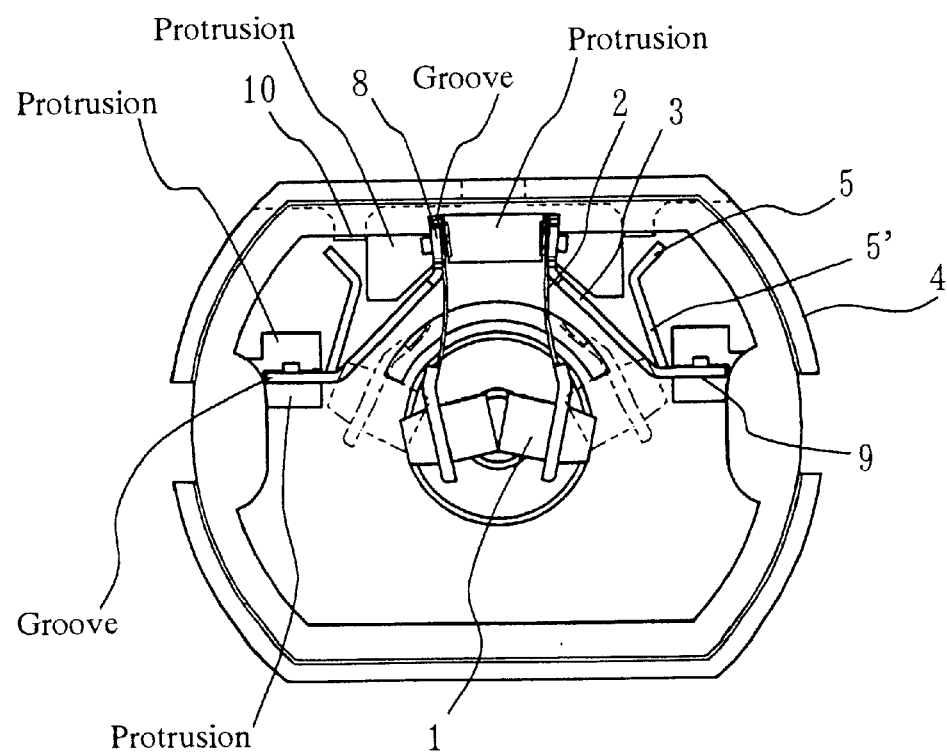
FIG. 2 is a view of the case cover viewed from the inside, being removed from the small-size motor shown in FIG. 1.
Figure 3:
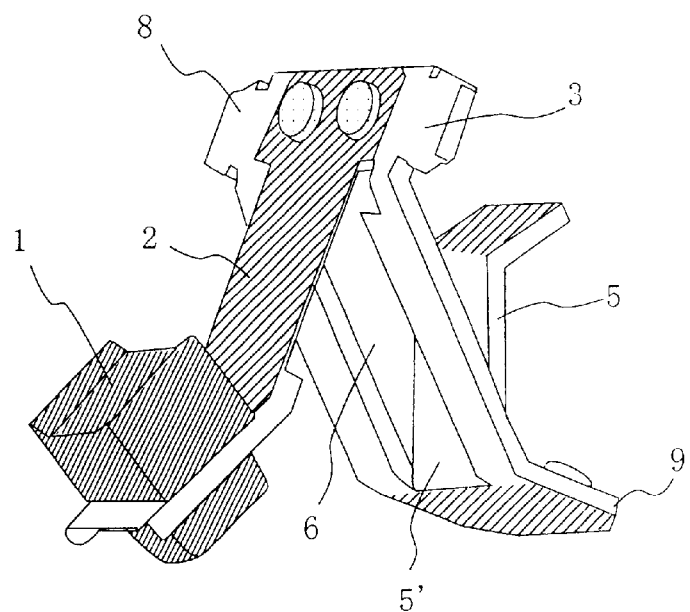
FIG. 3 is a view of one of a pair of symmetrical brush units shown in FIG. 2, showing a state of being taken out of the motor.

FIG. 2 is a view of the case cover viewed from the inside, being removed from the small-size motor shown in FIG. 1. FIG. 3 is a view of one of a pair of symmetrical brush units shown in FIG. 2, showing a state of being taken out from the motor.

The brush unit includes a carbon brush 1 being in slidable contact with the commutator, a brush arm 2 for press fitting and holding the carbon brush 1, and a brush base 3 connected with the brush arm 2 by caulking. The caulking is performed by inserting protrusions provided on the connection face of the brush base 3 into holes formed correspondingly in the brush arm 2 as shown in FIG. 3 and then by crushing the tip ends of the protrusions by applying a pressure. The brush base 3 is provided with a receptacle terminal 5 which is formed by cutting and raising a central part of the brush base 3. Therefore, when the receptacle terminal 5 is cut and raised from the brush base 3, a hole 6 corresponding to the cut is formed in the central portion of the brush base 3.

The brush units configured as described above are pressed in and held by the case cover 4 as shown in FIG. 2. At this time, the brush unit is fixed at two locations of a fixing portion 8 in which the brush arm 2 is fixed to the brush base 3, and an end portion 9 of the brush base which is integral with a base portion 5' of the receptacle terminal 5. This fixation can be accomplished by forming integrally molded protrusions so as to form attachment grooves on the case cover 4 made of synthetic resin and by press fitting the portions into the grooves. By this configuration, the brush arm 2 can be made straight without being bent, and also a sufficient length of the receptacle terminal 5 can be secured. Further, despite the sufficiently increased length of the receptacle terminal 5, the contact portion in which the receptacle terminal 5 comes into contact with an outside terminal can be located at a position near an outside terminal insertion hole 10, so that this receptacle terminal 5 can be used for a short outside terminal.

Figure 4:
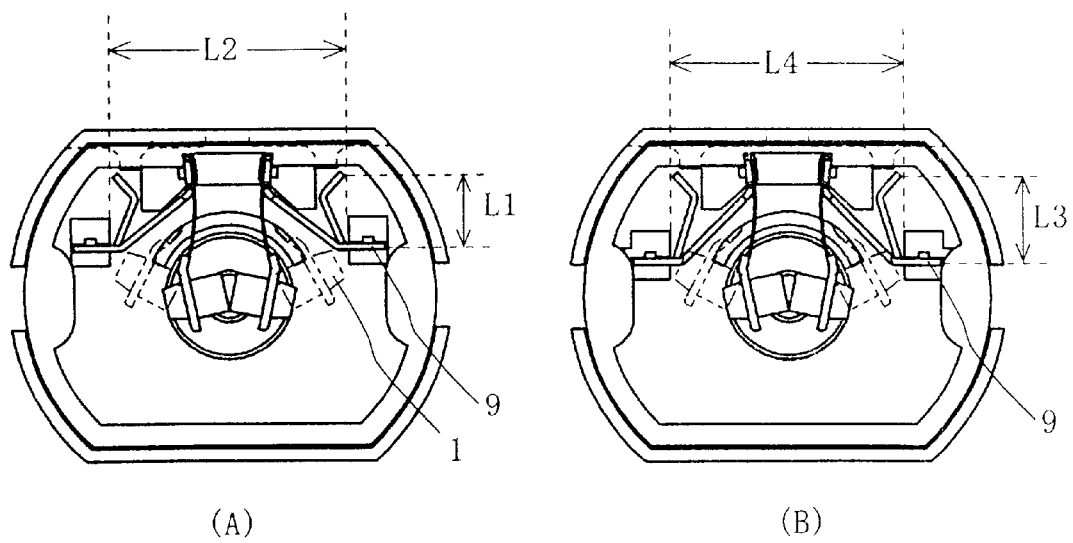
FIG. 4 is a view for illustrating a function of a brush unit in accordance with the present invention.

The functions of the brush unit in accordance with the present invention will further be described with reference to FIG. 4. FIG. 4(B) is the same view as FIG. 2, which shows the brush units in accordance with the present invention. FIG. 4(A) is a view for comparison, in which it is assumed that the brush unit does not have a base hole 6. In assembling a small-size motor as in the present invention (see FIG. 1), a rotor is assembled integrally on the shaft 15, the shaft 15 is inserted into the bearing 23 in the center of the bottom of the motor case 21, and thereafter the case cover 4 to which the brush units are assembled is mounted on an opening of the motor case 21. At this time, the oil retaining washer 18 which may be have a large diameter as shown in FIG. 1 must be passed between the paired carbon brushes 1. Only at that time in assembling the motor, a space between the paired carbon brushes 1 must be widened large.

In FIG. 4(A) in which the brush unit has no base hole, the base portion of the receptacle terminal 5 (end portion 9 of the brush base 3) must be arranged and fixed so that the carbon brush 1 does not hit the base portion of the receptacle terminal 5 at the time of assembly. Therefore, it is necessary to locate the base portion of the receptacle terminal at a relatively high position, so that a spring length of the receptacle terminal 5 is made short (L1), by which sufficient spring properties cannot be ensured. In order to ensure sufficient spring properties by using a short receptacle terminal portion, an expensive material must be used for the brush base, and also a workability problem caused by the change in material occurs.

On the other hand, in the brush unit in accordance with the present invention, which has a base hole as shown in FIG. 4(B), the carbon brushes 1 opened large at the time of assembly can be let go into the base holes 6. Therefore, the base portion of the receptacle terminal 5 (end portion 9 of the brush base 3) can be located and fixed at a position nearer to the carbon brush (at a lower position in the figure), and a sufficient spring length (L3>L1) for ensuring the intended spring properties can be provided. Further, since a distance between the fixing portions of the base portions of the receptacle terminals 5 can be shortened (L4<L2), when a connector in which a pair of outside terminals being into contact with the receptacle terminals 5 are integrally formed is used, the connector can be made small in size. Also, the hole in the brush base 3 can accommodate not only a part of the carbon brush 1 but also the brush arm 2, so that this configuration can also be applied to a fork brush.

Figure 5:
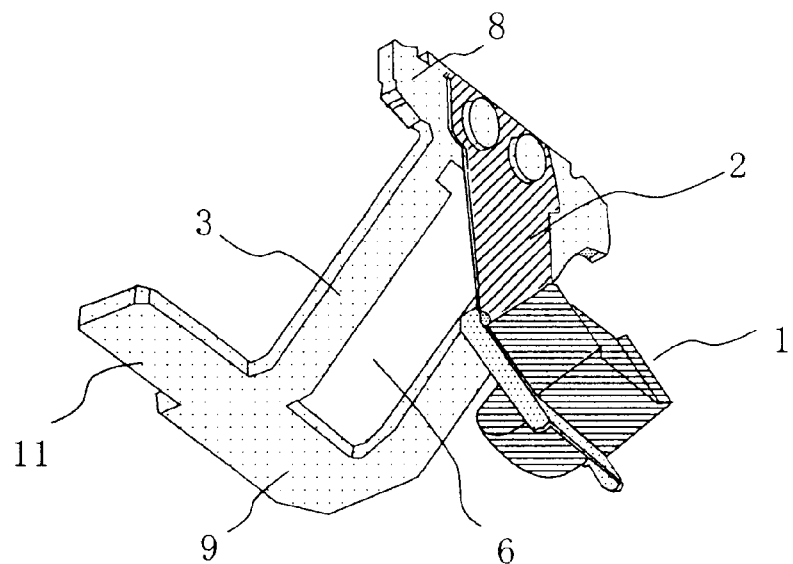
FIG. 5 is a view showing another example of the brush unit embodying the present invention.

FIG. 5 is a view showing another example of the brush unit embodying the present invention. This brush unit is the same as the brush unit described with reference to FIG. 3 previously in that the brush unit has the base hole 6. In this example, however, the brush unit does not have the receptacle terminal, but has a male terminal 11 integrally formed at one end (tip end side) of the brush base 3. For the brush unit configured as described above, as in the configuration shown in FIG. 3, when the brush unit is pressed in and held by the case cover 4, the brush unit is pressed and fixed in attachment grooves integrally formed on the case cover 4 made of synthetic resin at two locations of a fixing portion 8 in which the brush arm 2 is fixed to the brush base 3, and an end portion 9 of the brush base 3. By this configuration, the brush arm 2 can be made straight and fixed to the brush base 3 by caulking without being bent. Also, since the base hole 6 is formed in the center of the brush base 3, the carbon brushes 1 opened large can be let go into the base holes 6 at the time of assembly, so that the end portion of the brush base 3, which is a fixing portion, can be arranged freely.

Figure 6:
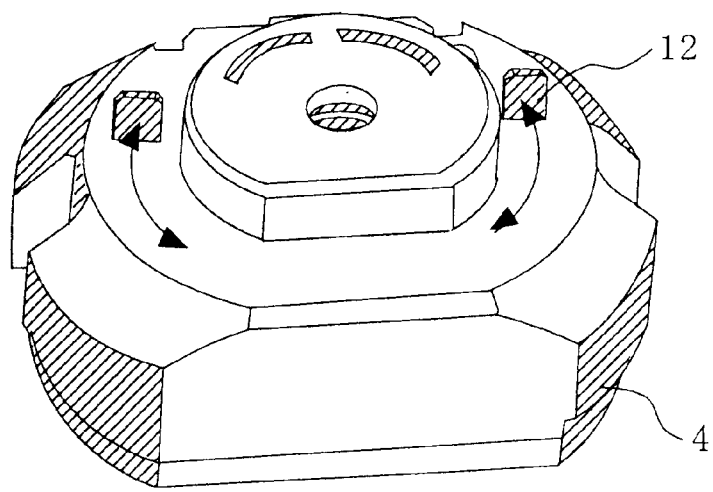
FIG. 6 is a perspective view of a case cover for attaching the brush unit shown in FIG. 5, in which the case cover is viewed from the outside.
Figure 7:
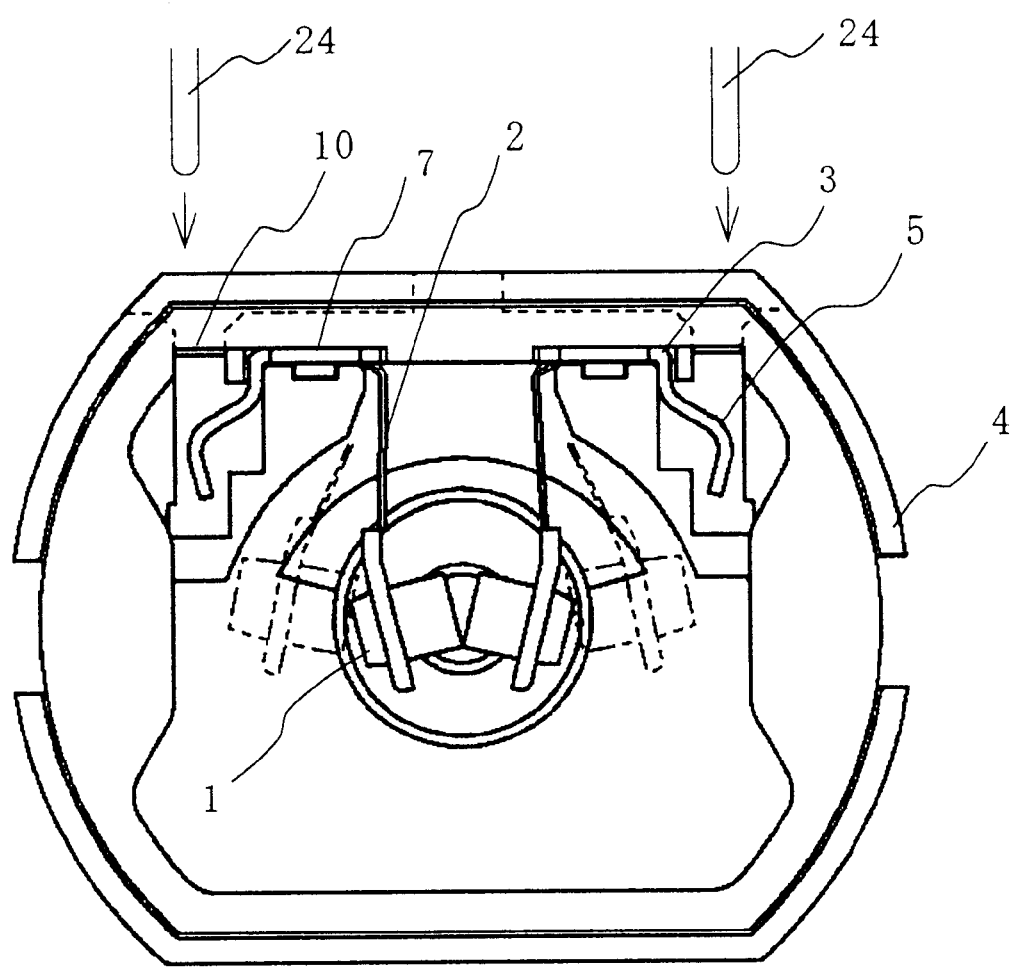
FIG. 7 is a view showing brush units attached to a case cover of a conventional small-size motor.

FIG. 6 is a perspective view of the case cover for attaching the brush units shown in FIG. 5, in which the case cover is viewed from the outside. In FIG. 6, reference numeral 12 denotes a pair of male terminal projecting holes for projecting the male terminals 11. When the brush units shown in FIG. 5 are fixed to the case cover 4, the paired male terminals 11 project through the male terminal projecting holes 12. The positions of the male terminal projecting holes 12 must be changed as indicated by the arrow marks in FIG. 6 according to the application of the small-size motor or according to the user's demand. However, in the small-size motor having field magnets, the positional relationship between the magnets, commutator, and carbon brush is substantially fixed. It is undesirable from the viewpoint of motor production that this positional relationship be changed by a minor design change. Contrarily, according to the illustrated configuration, the male terminal projecting positions can be changed without a change of positional relationship between the carbon brush and the commutator and moreover without contact of the back of the carbon brush with the brush base when the brushes are opened.

INDUSTRIAL APPLICABILITY

As described above, according to the present invention, since the brush arm can be configured so as to be straight, a vibration component in the axial direction of the motor can be restrained at sliding portions at which the brushes slide with respect to the commutator at the time of motor rotation.

Also, according to the present invention, the receptacle terminal formed by cutting and raising the brush base is provided, and thereby the base hole corresponding to the receptacle terminal is formed in the brush base. Therefore, the backs of the carbon brushes opened at the time of motor assembly can go into the base holes, so that the degree of freedom of change in brush unit fixing position is increased. As a result, the receptacle terminal can be designed so as to be long, thereby to ensure sufficient spring properties.

Also, according to the present invention, the brush unit is installed to the case cover at two locations of the fixing portion in which the brush arm is fixed to the brush base, and the end portion of the brush base, so that a change in brush tension after the outside terminals are inserted through the outside terminal insertion holes is decreased greatly.

Also, according to the present invention, since the base hole is formed in the brush unit using the male terminal, there is no possibility of the backs of the carbon brushes contacting with the brush bases when the brushes are opened, so that the male terminal projecting positions can be decided flexibly.

What is claimed is:

1. A small-size motor having a case of a bottomed hollow cylindrical shape fitted with a magnet on an inner peripheral surface thereof, a case cover mounted so as to close an opening of said case and fitted with brush units, and a rotor fitted with a laminated core, windings wound on said laminated core, and a commutator on a shaft, said motor comprising:

each of said brush units including a brush being into slidable contact with said commutator, a brush arm for holding said brush, and a brush base connected with said brush arm;

said brush arm being fixed to said case cover at a fixing portion in which said brush arm is connected with said brush base, and said brush arm extending substantially straight from said fixing portion;

said brush base being provided with a receptacle terminal formed by cutting and raising said brush base, and thereby to define a base hole corresponding to said receptacle terminal; and said case cover being formed with outside terminal insertion holes for inserting terminals for electrical connection from the outside to bring said terminals into contact with said receptacle terminals, wherein each of said brush units is installed to said case cover at two locations of a fixing portion in which said brush arm is fixed to said brush base, and a brush base end portion integral with a base portion of said receptacle terminal.

2. The small-size motor according to claim 1, wherein the back of said carbon brush goes into said base hole at the time of assembly, and the brush units are configured symmetrically.

3. The small-size motor according to claim 1, wherein installation of said brush unit to said case cover at two locations is accomplished by forming integrally protrusions so as to form attachment grooves on said case cover made of synthetic resin and by press fitting said brush unit into said grooves.

4. A small-size motor having a case of a bottomed hollow cylindrical shape, fitted with a magnet on the inner peripheral surface thereof, a case cover mounted so as to close an opening of said case and fitted with brush units, and a rotor fitted with a laminated core, windings wound on said laminated core, and a commutator on a shaft, said motor comprising:

each of said brush units including a brush being into slidable contact with said commutator, a substantially straight brush arm for holding said brush, and a brush base connected to said brush arm;

said brush base being formed with a base hole in the center thereof, and a male terminal for electrical connection from the outside being provided at one end of said brush base; and said case cover being formed with openings for projecting said male terminals, wherein each of said brush units is installed to said case cover at two locations of a fixing portion in which said brush arm is fixed to said brush base, and a brush base end portion.

5. The small-size motor according to claim 4, wherein the back of said carbon brush goes into said base hole at the time of assembly, and the brush units are configured symmetrically.

6. The small-size motor according to claim 4, wherein installation of said brush unit to said case cover at two locations is accomplished by forming integrally protrusions so as to form attachment grooves on said case cover made of synthetic resin and by press fitting said brush unit into said grooves.

7. A motor comprising:

a case;

a case cover connected to said case;

a rotor rotatably mounted in said case and said case cover, said rotor including a commutator;

a brush unit mounted on said case cover, said brush unit including a brush movable between first and second positions, said first position arranging said brush into contact with said commutator, said brush unit including a brush base connected to said brush, said brush unit including a receptacle terminal having one end connected to said brush base, said receptacle terminal angularly extending away from said brush base, said receptacle terminal forming an electrical connector of the motor, said case cover defining a terminal insertion hole in alignment with said receptacle terminal for passing an outside electrical conductor through said terminal insertion hole and into contact with said receptacle terminal, said brush base defining a base hole, said brush being arranged inside said base hole in said second position of said brush.

8. A motor in accordance with claim 7, wherein:

said case cover defines grooves;

said brush unit includes first and second protrusions arranged spaced from each other, said first and second protrusions being arranged in said grooves to fix said brush unit to said case cover.

* * * * *